United States Patent
Light et al.

(10) Patent No.: US 7,337,466 B2
(45) Date of Patent: Feb. 26, 2008

(54) INFORMATION HIDING THROUGH TIME SYNCHRONIZATION

(75) Inventors: John J. Light, Beaverton, OR (US); Trevor A. Pering, Mountain View, CA (US); Muralidharan Sundararajan, Portland, OR (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 688 days.

(21) Appl. No.: 10/616,370

(22) Filed: Jul. 8, 2003

(65) Prior Publication Data

US 2005/0010768 A1    Jan. 13, 2005

(51) Int. Cl.
*H04L 9/32* (2006.01)
(52) U.S. Cl. .............................. 726/2; 726/16; 726/20
(58) Field of Classification Search ........ 713/182–183, 713/185; 726/2, 16, 20–21
See application file for complete search history.

(56) References Cited

U.S. PATENT DOCUMENTS

| 6,950,949 | B1 * | 9/2005 | Gilchrist ...................... 726/19 |
| 2002/0029341 | A1 * | 3/2002 | Juels et al. .................. 713/202 |
| 2003/0091215 | A1 * | 5/2003 | Lauper et al. .............. 382/117 |
| 2003/0098776 | A1 * | 5/2003 | Friedli ......................... 340/5.8 |
| 2004/0093527 | A1 * | 5/2004 | Pering et al. ................ 713/202 |

FOREIGN PATENT DOCUMENTS

| DE | 101 18 209 A1 | 10/2002 |
| GB | 2 313 460 A | 11/1997 |

OTHER PUBLICATIONS

Mizutani R et al, "Evaluating Security of a Simple Interactive Human Identification Scheme", IEICE Transactions on Fundamentals of Electronics, Communications and Computer Sciences, Institute of Electronics Information and Comm. Eng. Tokyo, JP, vol. E78-A, No. 5, May 1, 1995, pp. 577-578, XP000521823.
International Search Report, International App. No. PCT/US2004/021217, Applicant Ref. No. P16121PCT, Completion Date: Nov. 26, 2004, Date Mailed: Dec. 6, 2004, pp. 4.

* cited by examiner

*Primary Examiner*—Hosuk Song
(74) *Attorney, Agent, or Firm*—Blakely, Sokoloff, Taylor & Zafman LLP

(57) ABSTRACT

Authenticating a user operating a portable computing device includes causing a sequence of images to be shown on a display, accepting an input selection from the user indicating that a currently displayed image of the sequence of images corresponds to a portion of the user's password, the user's password being known by the portable computing device, correlating the input selection to the currently displayed image, and allowing access to the portable computing device when the input selection and the currently displayed image temporally correspond to the portion of the user's password.

24 Claims, 3 Drawing Sheets

INFORMATION HIDING THROUGH TIME SYNCHRONIZATION

BACKGROUND

1. Field

The present invention relates generally to computer security and ubiquitous computing and, more specifically, to authentication at an un-trusted public access computing system.

2. Description

User authentication is a central component of currently deployed computer security infrastructures. User authentication involves determining if the person attempting to gain access to a system is indeed a person authorized for such access. There are three main techniques for user authentication: 1) knowledge-based systems, which involve allowing access according to what a user knows; 2) token-based systems, which involve allowing access according to what a user possesses; and 3) biometrics-based systems, which involve allowing access according to what the user is. Although biometrics can be useful for user identification, one problem with these systems is the difficult tradeoff between imposter pass rate and false alarm rate. In addition, many biometric systems require specialized devices, which may be expensive. Token-based schemes are problematic if the token is misplaced or stolen. Most token-based authentication systems also use knowledge-based authentication to prevent impersonation through theft or loss of the token. An example is automated teller machine (ATM) authentication, which requires a combination of a token (e.g., a bank card) and secret knowledge (e.g., a personal identification number (PIN)). For these and other reasons, in today's computer systems knowledge-based techniques are predominantly used for user authentication.

Despite their wide usage, textual passwords and PINs have a number of shortcomings. Many users forget their passwords and PINs. Simple or meaningful passwords are easier to remember, but are vulnerable to attack. Passwords that are complex and arbitrary are more secure, but are difficult to remember. Since users can only remember a limited number of passwords, they tend to write them down or will use similar or even identical passwords for different purposes. This of course weakens the security of systems used with the passwords. In addition, some systems may be vulnerable to a keystroke-saving program or a device that supports a "replay attack." Such a technique may be used surreptitiously to capture the inputting of the password by the authorized user in order to facilitate subsequent unauthorized access by another.

This problem of replay attacks is exacerbated for the situation where a user desires to use an un-trusted public access computing system. For example, an un-trusted public access computing system may be sited in a café, an airport lounge, a public library, a hotel lobby, or other public place. An individual user makes only temporary use of the system, and has little control over its overall security. Unknown to the user, a malicious person may have instituted an input capturing device or program in the system to capture the user's password or other user data.

Hence, techniques to deter replay attacks by malicious persons in the situation of un-trusted public access computing systems are desirable.

BRIEF DESCRIPTION OF THE DRAWINGS

The features and advantages of the present invention will become apparent from the following detailed description of the present invention in which.

DETAILED DESCRIPTION

Figure 1:
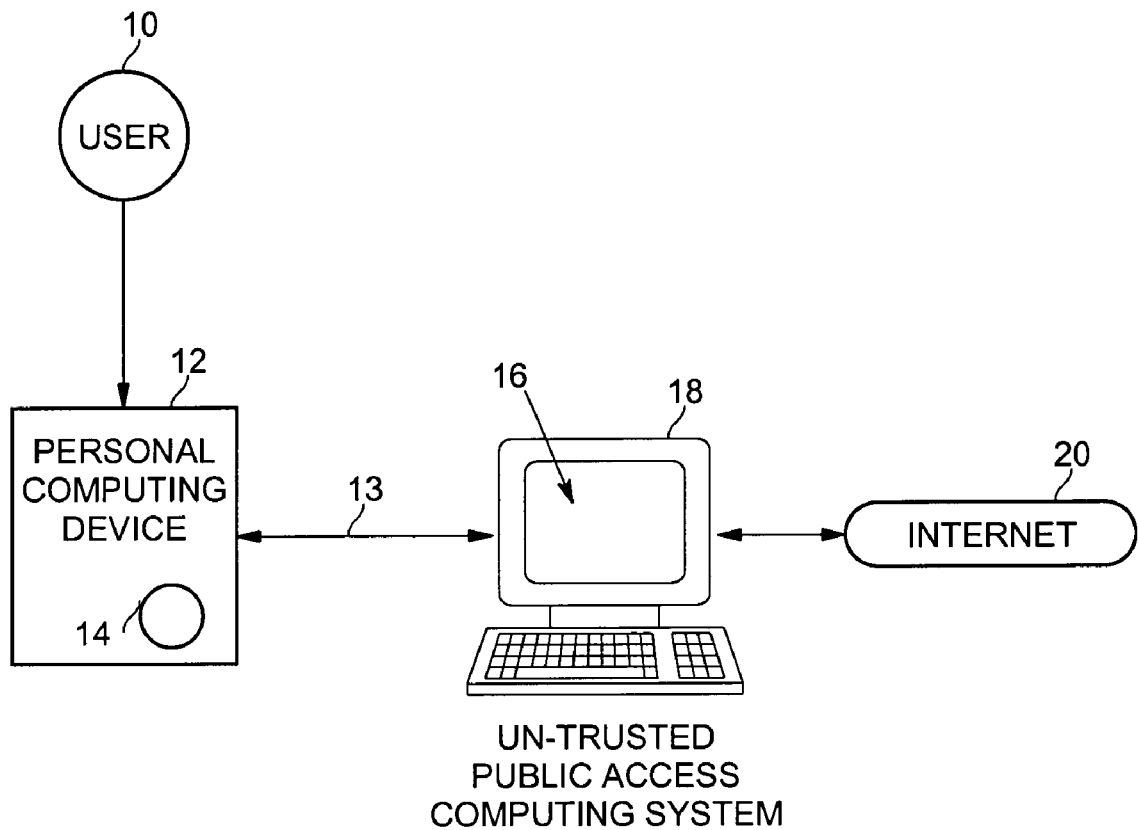
FIG. 1 is a diagram of a system supporting information hiding through time synchronization according to an embodiment of the present invention.

Embodiments of the present invention comprise a method and system for authenticating a user when the user desires to use an un-trusted public access computing system. In at least one embodiment, the user interacts with a portable computing device having a limited input capability to send at least one command to the portable computing device when the user sees a particular image displayed on an un-trusted public access computing system. The display of a plurality of images on the un-trusted public access computing system may be synchronized temporally with the expected user inputs and correlated by control software executing on the portable computing device. That is, a visible process on the display of the un-trusted public access computing system is synchronized in time with an invisible process (to the user or others) on the portable computing device. In one embodiment, the images shown on the un-trusted system may be communicated from the portable computing device to the un-trusted system prior to display. When the correct sequence of one or more commands is entered at the right times corresponding to the synchronized displayed images, further processing or further access to the portable computing device may be authorized. If the correct sequence of commands is not entered at the right time, authorization may be withheld. In one embodiment, the portable computing device controls the display of images on the un-trusted public access computing system, receives the user inputs, and compares the received user inputs with expected inputs that have been time synchronized with the displayed images in order to make an authentication determination. The process of authentication betrays no secret information to an outside observer who can only see the display, except possibly to one who is able to monitor the actions of the user in entering input data to the portable computing device. The present process helps to ensure that an adversary will not learn anything that will enable him or her to authenticate himself or herself to the portable computing device in the future, thus deterring replay attacks. Since the user is not entering authentication data into the un-trusted computing system, the possibility of surreptitious keyboard capture of a password is removed.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Public Internet access points, such as those found in airports, libraries, Internet cafés, hotels, and other public places, provide convenient, social, and economical access to the web, although at an increased security risk. Such public access points are becoming increasingly popular. However, while convenient, these access points represent a security risk because they are typically out of the control of the patron (e.g., Internet user), and sometimes even the proprietor (e.g., café owner). For example, it would be relatively easy for an individual to walk into most Internet cafés and insert a small device between the keyboard and main computer that captures all of the user's keystrokes. Furthermore, once this technique has been used to capture a text-based password, that same password can be used, unaltered, to re-login to the same website or system and possibly others, at any time.

To deter such replay attacks at public access points, embodiments of the present invention provide time synchronization of displayed images with expected inputs to a portable computing device held or worn by the user. The input data entered by the user is never communicated to the public access point. Instead, the portable computing device correlates the user inputs to the displayed images that the portable computing device directed to be displayed to the user. In this way, the user may be authenticated for using the portable computing device without revealing any password information at the public access point or to anyone observing the displayed images.

FIG. 1 is a diagram of a system supporting information hiding through time synchronization according to an embodiment of the present invention. A user 10 carries or wears a small portable computing device 12. In one embodiment, the user may be situated in a public place having an un-trusted public access computing system 18. The public place may be a coffee shop, a bookstore, an airport lounge, a hotel lobby, a library, a mall, or any other establishment where people may congregate. The portable computing device 12 may be a handheld or wearable computing device such as a personal server (PS), a personal digital assistant (PDA), a cellular phone, a tablet PC, a portable audio player, a portable video player, or other handheld device. In at least one embodiment, the portable computing device comprises a mobile computing system designed to enable interaction with a user's personal data through the surrounding publicly available computing infrastructure. In one embodiment, the portable computing device includes no display or elaborate input mechanisms. Instead, the portable computing device temporarily co-opts the displays, keyboards, mice, and/or other input and output devices of nearby publicly available computing systems through a short-range wireless link 13. This usage model addresses two major problems associated with mobile information access: the inherent difficulty of using small user interfaces on handheld devices, and the limited access to personal digital information afforded by public access points. The portable computing device includes a localized communication capability using well-known wireless techniques (e.g., Bluetooth, Wi-Fi, etc.), and enough high-density storage and low power, high performance processing to serve the user's mobile computing and storage needs. The result is that a mobile user can enjoy the benefits of a large display and a full sized keyboard without having to carry a bulky computing platform with him or her.

The portable computing device may include memory to store the user's data, such as text files, audio files, image files, video files, data files, etc. The portable computing device may also include at least one input mechanism 14, such as a button for example. In one embodiment, the portable computing device comprises at least a microprocessor, dynamic random access memory, flash memory, an input/output (I/O) interface, a compact flash (CF) slot, a wireless communications module (e.g., a Bluetooth module), and a battery. The microprocessor executes instructions stored in at least one of the memory devices to provide the functionality described herein. The wireless communications module operates to allow wireless communication between the device and other systems. The memory devices also store the user's data, as well as a user password.

In one embodiment, the portable computing device stores the user's data and, through an interactive session, may control the display or other rendering of the user's data on a display 16 of an un-trusted public access computing system 18. The public access computing system may comprise a personal computer (PC), a computer terminal coupled to a computer system, a computer-based kiosk, a stand-alone display, or any other device capable of communicating with the portable computing device and/or a network such as the Internet 20.

Prior to communicating any user data from the portable computing device to the display 16 of the un-trusted public access computing system 18, the user should be authenticated. That is, it is desirable to verify that the person operating the portable computing device is actually the device's owner, and not someone who has stolen the device or someone who wants to examine the contents of the device while the device is temporarily outside of the immediate control of the owner. Furthermore, since the public access computing system is un-trusted by the user, the user may be apprehensive about typing in the user's password on a keyboard of the public access computing system prior to wireless communications between the public access computing system and the portable computing device. In some cases, the keystrokes input by the user could be captured by a device placed in the public access computing system by an attacker. If the keystrokes contain the user's log-in and password information for accessing the user's personal information (e.g., a bank account number, a personal web page, and so on) or for use of the portable computing device, the attacker may gain unauthorized access to the information and/or the portable computing device.

To deter this from occurring, embodiments of the present invention provide techniques for authenticating the user of the portable computing device in such a way that the un-trusted public access computing system cannot compromise the user's password. Furthermore, observation of displays of the un-trusted public access computing system will not provide an attacker with sufficient information to stage a replay attack.

Figure 2:
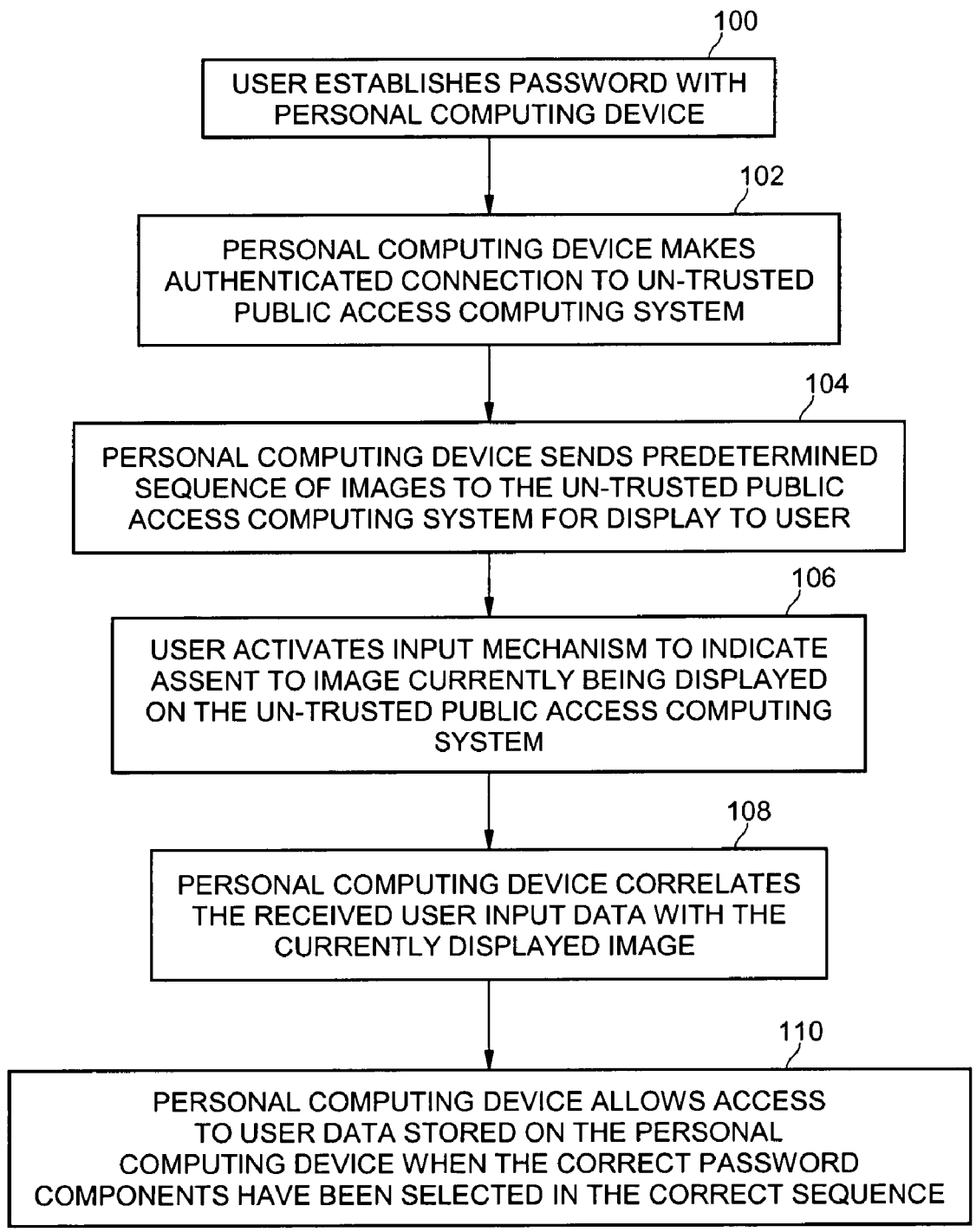
FIG. 2 is a flow diagram illustrating information hiding through time synchronization processing according to an embodiment of the present invention.

FIG. 2 is a flow diagram illustrating information hiding through time synchronization processing according to an embodiment of the present invention. At block 100, the user establishes a password with the portable computing device. This action may take place before any use of the portable computing device in a mobile setting. In one embodiment, the password may be set in the portable computing device using a communications path from another computing device, such as a PC. For example, the user may couple the portable computing device with his or her PC at home or at work via a communications bus such as a Universal Serial Bus (USB), or wirelessly using any one of several well-known wireless techniques and protocols (e.g., Bluetooth, Wi-Fi, etc.). The user may enter a password on his or her PC at home such that the password is transferred to the portable computing device and set up as the password for allowing access to data on the device or even use of the device at all. This assumes that the portable computing device may be communicatively coupled to the user's PC in order to set up the system and to transfer user files from the PC to the portable computing device. Once the password is set, subsequent mobile usage of the portable computing device in conjunction with an un-trusted public access computing system may require the password to be entered by the user using the techniques described herein.

After password initialization has been performed and user files have been transferred to the portable computing device, the user may use the portable computing device in a mobile fashion. That is, the user may desire to access the data stored on the portable computing device at some public location (hotel lobby, café, airport lounge, etc.) while the user is "on the go". Prior to accessing the data, the user should be authenticated. To start the authentication process, at block 102, the portable computing device makes an authenticated connection to the un-trusted public access computing system using known methods. In one embodiment, this connection may be wireless, using known methods such as Bluetooth or Wi-Fi, for example. In another embodiment, the connection may be a pluggable wired network such as Universal Serial Bus (USB) or Ethernet, for example. Next, at block 104, the portable computing device sends a predetermined sequence of images to the un-trusted public access computing system for display to the user. The un-trusted public access computing system then displays the sequence of images to the user according to selected parameters provided by the portable computing device. Thus, the user has the opportunity to view a sequence of images on the display of the un-trusted public access computing system. The portable computing device coordinates and controls the sending of the images to the un-trusted public access computing system such that the portable computing device knows when a given image is being shown on the display for viewing by the user. Note that the un-trusted public access computing system merely displays the images that the portable computing device sends to it and has no knowledge of their context or meaning, nor does the un-trusted public access computing system ever receive or store the user's password.

In one embodiment, the images may be sent using a hyper text transport protocol (HTTP) and may comprise web pages in hyper text markup language (HTML) format, with the un-trusted public access computing system providing a browser capability, although other protocols, file formats, and display tools may also be used and the present invention is not limited in this respect. In at least one embodiment, communications between the portable computing device and the un-trusted public access computing system may be based on web protocols such as universal plug and play (UPnP), Simple Object Access Protocol (SOAP), and HTTP, which may be layered on top of an Internet Protocol (IP) networking stack enable by a Bluetooth personal area network (PAN) profile. Basic UPnP setup may be accomplished by a UPnP "device" broadcasting a service description which is picked up by the respective UPnP "control point." SOAP may be used to directly communicate between the two devices.

One image of the sequence of images may correspond to at least one portion of the user's password. When the image is displayed that corresponds to at least one component of the user's password, the user at block 106 activates an input mechanism on the portable computing device being worn or carried by the user to indicate assent to the image currently being displayed on the display of the un-trusted public access display system. In one embodiment, the input mechanism comprises a single button 14 on the portable computing device and the user depresses the button when the user sees the correct image displayed that corresponds to at least a portion of the user's password. In this embodiment, the button may have only two states (i.e., it is binary), either activated or non-activated. In other embodiments, the input mechanism may comprise a button on another device worn or carried by the user, such as a wristwatch or other device coupled either wireless or by wire to the portable computing device. In some cases, activation of the input mechanism (i.e., pushing the button) may not be easily observable by another person in the area observing the user, and/or may not be easily correlated by the observer to the displayed image.

At block 108, the portable computing device correlates the received user input data to the currently displayed image. Since the portable computing device instructed the un-trusted public access computing system to display a particular image at and for a particular period of time and the portable computing device knows the user's password (as a result of the password initialization processing), the portable computing device can verify that the user input indication correctly selects at least a portion of the user's password as that portion is being displayed to the user. In one embodiment, when the user selects the correct portion of the password, no visual indication of this is shown on the display. That is, there is no visual feedback to the user or to an observer that a correct password portion has been shown on the display.

If the user's password comprises multiple portions, blocks 104-108 may be repeated a plurality of times until all portions of the user's password have been processed. At block 110, the portable computing device allows access to user data stored on the portable computing device when the correct password components have been selected in the correct sequence by the user. In one example, this might include displaying the user's image files on the display of the un-trusted public access computing system. The user may wish to display his or her digital photographs to others, or give a presentation based on a set of images shown on the display, for example. Many other uses of the portable computing device are contemplated. If the correct sequence and timing of inputs is not received, the portable computing device may deny access to the user's data stored on the device.

Figure 3A:
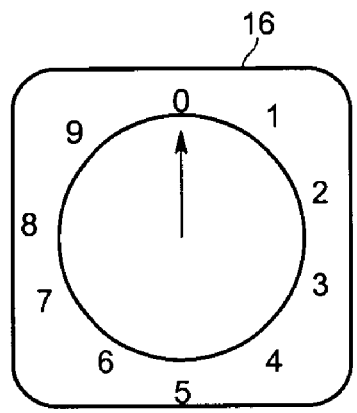
FIGS. 3A-3F are diagrams illustrating an example sequence of displays to a user according to an embodiment of the present invention.
Figure 3B:
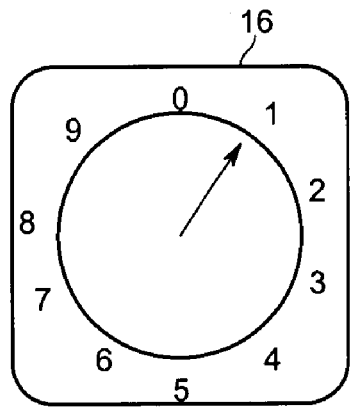
Figure 3C:
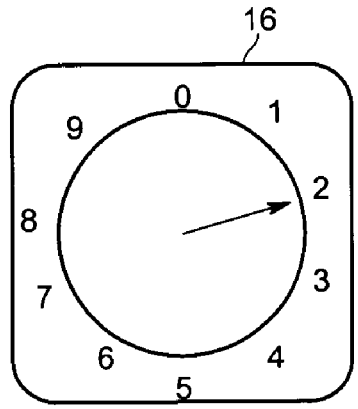
Figure 3D:
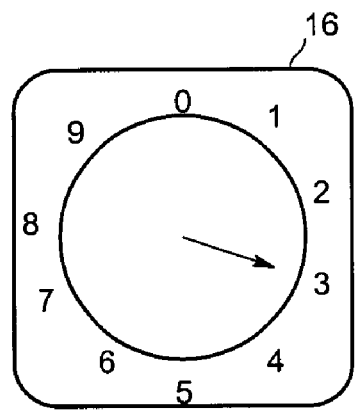
Figure 3E:
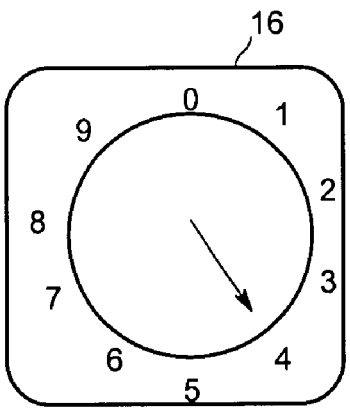
Figure 3F:
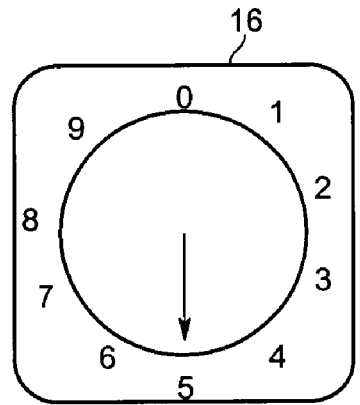

FIGS. 3A-3F are diagrams illustrating an example sequence of displays to a user according to an embodiment of the present invention. In one embodiment, the user password may be a sequence of one or more digits (such as a personal identification number (PIN)). In this non-limiting example, to start authentication processing the portable computing device instructs the un-trusted public access computing system to first display an image as shown in FIG. 3A. In one embodiment, the image may be displayed for a specified period of time. In one embodiment, the portable computing device 10 sends the image over a wireless link 13 to the un-trusted public access computing system 18 for display to the user. In one embodiment, this may occur when the user moves within range of the un-trusted public access computing system and the system auto-detects the presence of the user's portable computing device. In the example shown, the image indicates that the number "0" is currently being selected according to the arrow. This image may be displayed for a predetermined amount of time. If the number "0" is the correct first portion of the user's password, the user should indicate this fact by activating the input mechanism on the portable computing device while the "0" is selected according to the displayed image. If not, the user does nothing. Next, the portable computing device instructs the un-trusted public access computing system to display the image as shown in FIG. 3B. Again, if this selected number (i.e., "1") is the first portion of the user password, the user activates the input mechanism. If not, the user does nothing. The sequence of images as depicted in FIGS. 3C-3F is then shown. Once the arrow has gone around the circle, the user will have had the opportunity to select, at the appropriate time, any one of the numbers shown. This process may be repeated for each digit of a multi-digit password. When all password digits have been selected correctly by the user, authentication is complete.

One skilled in the art will readily recognize that the display portion of this technique may be implemented in many ways with many different parameters without departing from the scope of the present invention. For example, the user may select during the portable computing device initialization process the number of digits in the password, how many numbers to display in each challenge image, how long to display each image, and a time variance or tolerance for accepting a correct input selection. Any parameters specified may also be subsequently re-set or modified by the user once authenticated. The user may balance security with convenience in setting these parameters (e.g., longer passwords are more secure, but more cumbersome for password selection). Furthermore, the portions of the password may be alphanumeric characters instead of just numbers. In another variation, the portions of the password may be any symbols that a user can recognize and remember as a portion of a password (e.g., sports team logos, playing card values, slot machine values, famous trademarks, company logos, cartoon characters, state shapes, country shapes, photographs of people, animals, places, etc., and so on). Although the example of a circular clock face is shown in FIG. 3, any representation and/or format of symbols may be shown without departing from the scope of the present invention. For example, the symbols for possible password portions may be in displayed in any geometric configuration (e.g., in rows, columns, or randomly distributed on the display), and the indication of the current selection may be done by highlighting, by changing color or contrast, by flashing or blinking, or by any technique to indicate to the user that the portion may currently be selected when the user activates the input mechanism. In one embodiment, the exact sequence of password portions and a time variance may be required. In another embodiment, the order of the password portions may immaterial. In still another embodiment, the visual cues may also include or be replaced by audio signals (e.g., audible words and phrases, musical notes, tones, and so on).

In yet another embodiment, visual feedback of a correct selection of a portion of the user's password may be employed. When the user selects a correct portion, an indication of this may be shown on the display (e.g., a "*" may be shown in a location on the display for each correctly selected password portion). The indication should only be shown on the display at the end of a display cycle or other presentation of possible password portions per iteration, in order to not provide a clue to an observer as to the correct password portion. This positive visual feedback may assist the user in keeping track of the current position for selecting a portion of the password in the sequence of displayed images, yet the feedback symbols may not indicate to an observer anything about the user password. In another embodiment, if the user fails to activate the input mechanism during a presentation cycle or the input isn't received by the portable computing device, any visual progress indicator (e.g., an arrow or the like) might not be advanced, thereby allowing the user to handle interruptions in the authentication process.

The time synchronization of the present invention may be provided by a signal over the wireless link from the portable computing device to the un-trusted public access computing system, indicating the start of the process and the rate at which it should proceed, or by a signal when each step in a given cycle should occur. In one embodiment, the signal may comprise communication of each set of symbols to be displayed.

The present invention may be subject to various denial of service (DOS) attacks, including ones that attempt to disrupt the time synchronization between the portable computing device and the display. In general, it would be very difficult to launch such a DOS attack without it being immediately apparent to the user from the appearance of the display that such an attack was occurring.

While the present invention may be intended as a relatively lightweight authentication method in a larger security scenario, it can be made more secure. Consider an attacker gathering information by listening to the electromagnetic interference (EMI) signature of the portable computing device, potentially revealing the time when the button was pressed, and observing the display using a camera, screen scraping, or just looking over the shoulder of the user. Additional protection may be obtained in some embodiments by randomizing the digits, alphanumeric characters, logos, or other symbols on each cycle, so that inter-selection timings can't be used to reproduce the password. This would prevent the EMI signature revealing timing information that can be directly interpreted as the password. Further protection may be achieved by ensuring that the portable computing device's electrical activity is sufficiently rich and varied to hide any EMI signature associated with an input mechanism activation. If EMI signatures combined with observations of the display contents are considered a threat, in one embodiment, the images may be configured to show multiple clocks or number boxes on the display, each changing over time in the sequence of images with its own period and phase, and only the user would know which clock or number box was the right one that mattered for the password portion.

Embodiments of the present invention thus provide an authentication mechanism that is easily understood, easy to use, and similar in concept to a typed password, but works reliably and reduces the disclosure of secret information on an un-trusted public access computing system.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-processor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be-used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of authenticating a user attempting to access a portable computing device comprising:
   causing a sequence of images to be shown on a display, wherein each image is distinguished on the display on the basis of time;
   accepting an input selection from the user indicating that a currently distinguished image of the sequence of images corresponds to a portion of the user's password, the user's password being known by the portable computing device;
   correlating the input selection to the currently distinguished image; and
   granting access to the portable computing device when the currently distinguished image corresponds to the portion of the user's password and the input selection is synchronized with the currently distinguished image.

2. The method of claim 1, wherein the password comprises a plurality of portions, and further comprising repeating the causing, accepting and correlating for each of the plurality of password portions, and allowing access to the portable computing device when all input selections are synchronized with distinguished images that correspond to the password.

3. The method of claim 1, wherein causing the sequence of images to be shown on a display comprises sending the sequence of images over a wireless link to a computing system including the display.

4. The method of claim 1, further comprising setting the user's password in the portable computing device prior to causing the sequence of images to be shown on the display.

5. The method of claim 1, wherein each image of the sequence of images comprises a plurality of symbols, the symbols comprising at least one of alphanumeric characters, playing card values, sports team logos, company logos, cartoon characters, and photographs, and each password portion comprises at least one of the symbols.

6. The method of claim 1, further comprising causing the display of visual feedback to the user when a portion of the user's password is correctly selected.

7. The method of claim 1, wherein the display is part of a computing system un-trusted by the user.

8. The method of claim 7, further comprising establishing an authenticated connection from the portable computing device to the un-trusted computing system including the display prior to causing the sequence of images to be shown on the display.

9. An article comprising:
   a storage medium having a plurality of machine readable instructions, wherein when the instructions are executed by a processor, the instructions provide for authenticating a user attempting to access a portable computing device by
   causing a sequence of images to be shown on a display, wherein each image is distinguished on the display on the basis of time;
   accepting an input selection from the user indicating that a currently distinguished image of the sequence of images corresponds to a portion of the user's password, the user's password being known by the portable computing device;
   correlating the input selection to the currently distinguished image; and
   granting access to the portable computing device when the currently distinguished image corresponds to the portion of the user's password and the input selection is synchronized with the currently distinguished image.

10. The article of claim 9, wherein the password comprises a plurality of portions, and further comprising instructions for repeating the causing, accepting and correlating for each of the plurality of password portions, and instructions for allowing access to the portable computing device when all input selections are synchronized with distinguished images that correspond to the password.

11. The article of claim 9, wherein instructions for causing the sequence of images to be shown on a display comprises instructions for sending the sequence of images over a wireless link to a computing system including the display.

12. The article of claim 9, further comprising instructions for setting the user's password in the portable computing device prior to causing the sequence of images to be shown on the display.

13. The article of claim 9, wherein each image of the sequence of images comprises a plurality of symbols, the symbols comprising at least one of alphanumeric characters, playing card values, sports team logos, company logos, cartoon characters, and photographs, and each password portion comprises at least one of the symbols.

14. The article of claim 9, further comprising instructions for causing the display of visual feedback to the user when a portion of the user's password is correctly selected.

15. The article of claim 9, further comprising instructions for establishing an authenticated connection from the portable computing device to an un-trusted computing system including the display prior to causing the sequence of images to be shown on the display.

16. A portable computing device comprising:
a memory to store instructions and data;
a processor to execute the instructions obtained from the memory to cause a sequence of images to be shown on a display of an un-trusted computing system, wherein each image is distinguished on the display on the basis of time, to accept an input selection from a user indicating that a currently distinguished image of the sequence of images corresponds to a portion of the user's password, the user's password being known by the portable computing device, to correlate the input selection to the currently distinguished image, and to grant access to the portable computing device when the currently distinguished image corresponds to the portion of the user's password and the input selection is synchronized with the currently distinguished image.

17. The portable computing device of claim 16, wherein the portable computing device comprises a wireless communications module for sending the sequence of images to be shown on the display over a wireless link to the un-trusted computing system.

18. The portable computing device of claim 16, wherein each image of the sequence of images comprises a plurality of symbols, the symbols comprising at least one of alphanumeric characters, playing card values, sports team logos, company logos, cartoon characters, and photographs, and each password portion comprises at least one of the symbols.

19. The portable computing device of claim 16, wherein the memory further comprises instructions to establish an authenticated connection from the portable computing device to the un-trusted computing system prior to causing the sequence of images to be shown on the display.

20. The portable computing device of claim 16, further comprising a button for entering the input selection by the user, the button indicating one of activation and non-activation.

21. The portable computing device of claim 16, wherein the memory stores the user's password and the sequence of images.

22. The method of claim 1, further comprising:
causing the sequence of images to be shown on the display concurrently and asynchronously with at least one other sequence of other images, without causing to show on the display that the at least one other sequence is to be disregarded in user authentication.

23. The article of claim 9, further comprising instructions for causing the sequence of images to be shown on the display concurrently and asynchronously with at least one other sequence of other images, without causing to show on the display that the at least one other sequence is to be disregarded in user authentication.

24. The portable computing device of claim 16, wherein the processor executes the instructions obtained from the memory to further cause the sequence of images to be shown on the display concurrently and asynchronously with at least one other sequence of other images, without causing to show on the display that the at least one other sequence is to be disregarded in user authentication.

* * * * *